United States Patent [19]
Wells

[11] 4,117,641
[45] Oct. 3, 1978

[54] INSULATION SYSTEM FOR BUILDING STRUCTURES

[75] Inventor: David Lee Wells, Denver, Colo.

[73] Assignee: Johns-Manville Corporation, Denver, Colo.

[21] Appl. No.: 776,694

[22] Filed: Mar. 11, 1977

Related U.S. Application Data

[63] Continuation-in-part of Ser. No. 691,689, Jun. 1, 1976, abandoned.

[51] Int. Cl.² .............................................. E04B 5/52
[52] U.S. Cl. ...................................... 52/404; 52/478; 52/489
[58] Field of Search ................. 52/364, 462, 463, 464, 52/478, 404, 518, 543, 544, 408, 479, 480

[56] References Cited

U.S. PATENT DOCUMENTS

| | | | |
|---|---|---|---|
| 2,175,226 | 10/1939 | Slayter | 52/409 |
| 2,648,103 | 8/1953 | Wahfeld | 52/546 |
| 3,046,700 | 7/1962 | Davenport | 52/478 |
| 3,083,506 | 4/1963 | Cacossa | 52/541 |
| 3,501,885 | 3/1970 | Abel | 52/495 |
| 3,703,795 | 11/1972 | Mattes | 52/409 |

FOREIGN PATENT DOCUMENTS 800,600  11/1950  Fed. Rep. of Germany ............ 52/481

*Primary Examiner*—John E. Murtagh
*Attorney, Agent, or Firm*—Robert M. Krone; Joseph J. Kelly; Charles C. Corbin

[57] ABSTRACT

Building structures, such as pre-engineered metal buildings, concrete buildings, and combination concrete and metal buildings in most areas require insulation due to the relatively high thermal conductance of the metal and concrete components in the builing structure, wall, and roof. Because of energy conservation measures brought on by fuel shortages and rapidly rising fuel costs, insulation systems used in the past are generally not adequate to meet more stringent standards either recently established or planned for the near future. The present invention provides an improved insulation system for use in either new constuction or in reinsulating existing building structures. The system of the present invention provides insulation for the areas of the wall or roof between the structural members, between the roof and the structural members and also between all or most of the structural members and the interior of the building itself to reduce significantly the heat loss experienced through the structural members common in conventional insulation systems.

11 Claims, 11 Drawing Figures

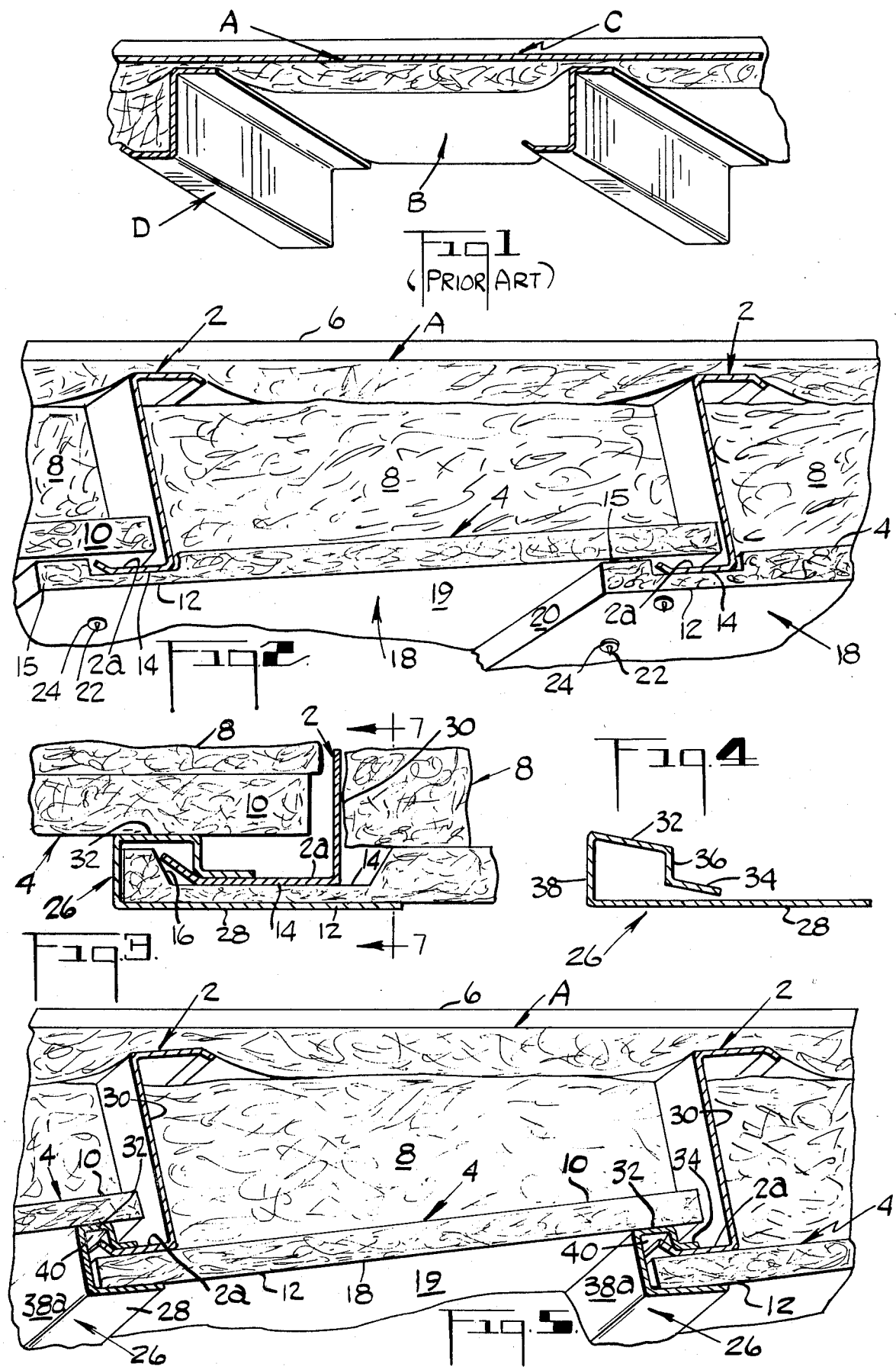

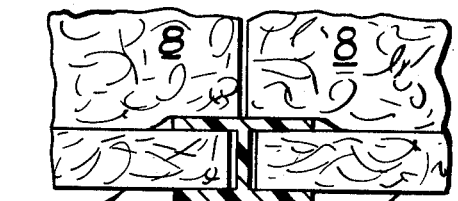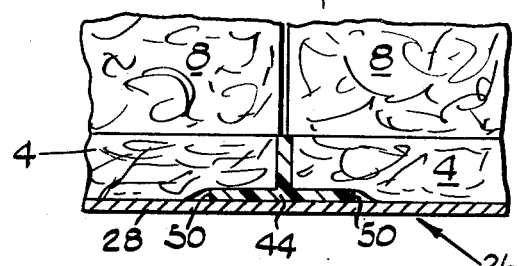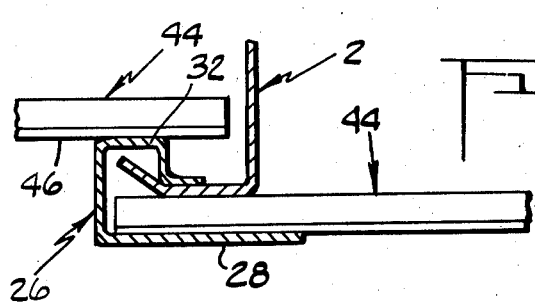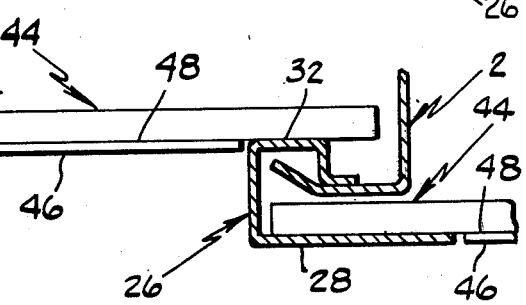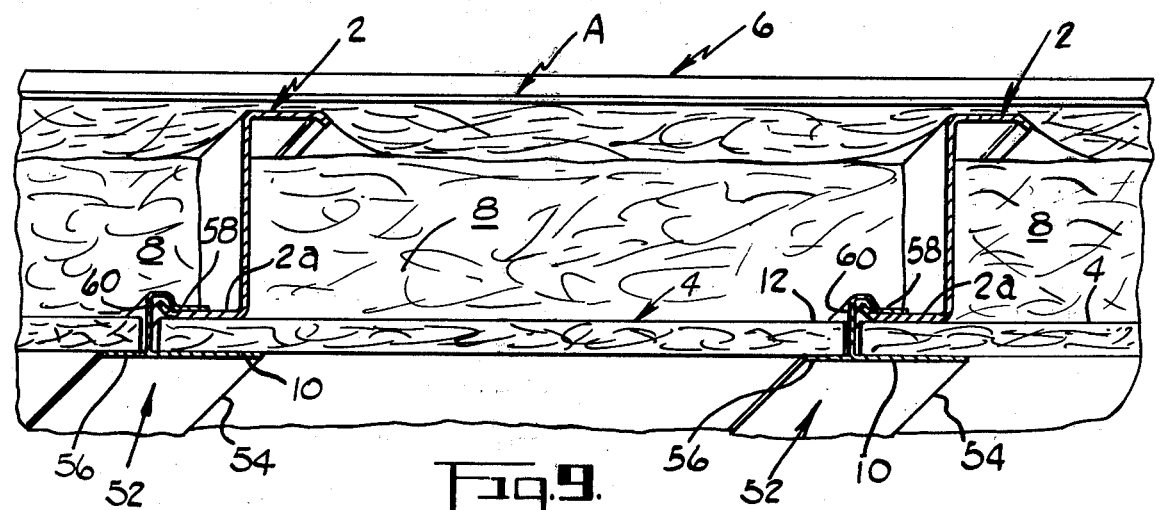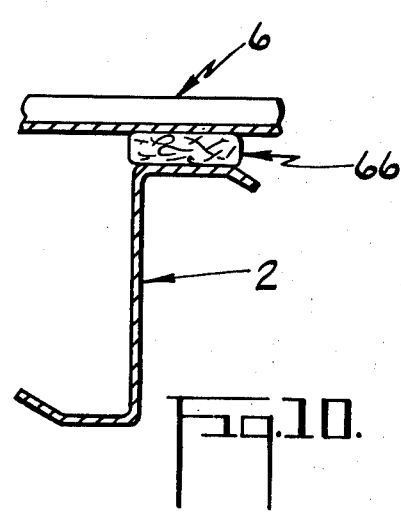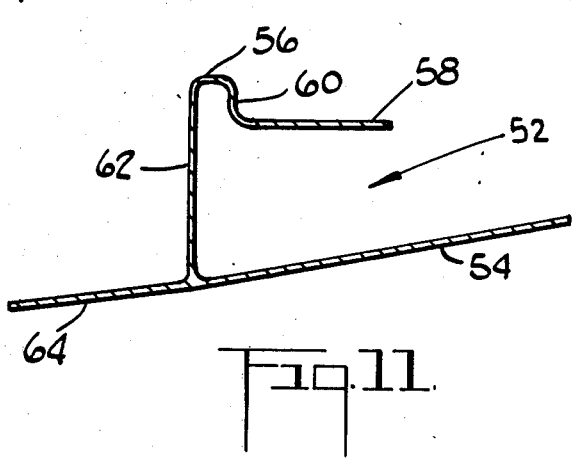

INSULATION SYSTEM FOR BUILDING STRUCTURES

CROSS-REFERENCE TO RELATED APPLICATION

This application is a continuation-in-part of copending application Ser. No. 691,689, which was filed June 1, 1976, entitled "Insulation System for Building Structures," now abandoned.

BACKGROUND OF THE INVENTION

The present invention relates to an insulation system that is easy to install and that thermally isolates most or all of the structural members of a building from the interior of the building as well as from the exterior covering of the building.

In the past, building structures such as metal buildings or buildings made from concrete structural members, or buildings made using combinations of concrete and metal structural members have been insulated in many ways. For example, fiber glass blanket insulation has been put between the structural members and held in place with such things as metal straps, chicken wire, etc. Rigid or semi-rigid boards of felted fibers such as glass fibers, have also been used for insulating metal and concrete buildings, but no attempt was made to isolate the structural members from the interior of the building and such rigid or semi-rigid boards did not provide sufficient insulation to meet the newly emerging standards.

Another insulating system used extensively, particularly in metal buildings, is shown in FIG. 1 and is described in detail in U.S. applications Ser. Nos. 588,734 and 591,584, both filed in June, 1975. This insulation product, known in the trade as RIGID-ROLL, comprises a layer of bonded glass fibers A which is flexible but yet board-like in that it tends to return to a board-like product after being bent and released. The layer of bonded glass fibers is faced with a vapor barrier B, such as a vinyl film. The facing, along a longitudinal edge, extends beyond the layer of bonded glass fibers to form a tab (not shown). The tab is reinforced so that when the strips of RIGID-ROLL are butted together and the tab overlies an adjacent strip, the tab forms a vapor barrier seal between adjacent strips of insulation when the metal roof sheets C are mounted in place over structural members such as D.

While such an insulation system is easy to install and offers many advantages over other systems, compression of the fibrous layer between the outer sheets C and the structural members D seriously reduces the insulating value of the insulation at those areas. As a result, such a system alone will not meet some of the high insulating standards required either by specifications or by economics in many areas of the country.

Another insulation system, which does meet high insulating standards and which may be used in metal buildings is described in U.S. Pat. No. 4,014,150. This system shows as in FIG. 2 a first thermal insulation 4 located between the structural members and the covering material, a second board-like thermal insulation 8 spanning between adjacent structural members, a third thermal insulation 12 having a higher insulating value than the second thermal insulation and located between the second insulation and the covering material, and a forth insulation means 14 which serves to isolate the support members from the interior of the building and to support the second thermal insulation 8 on either side of a web 3 of support members 2. The chief drawback of this insulation system lies in the fact that in the installation of the system the fourth insulation means 14 must be secured to the support member in the conventional time consuming manner by metal screws, rivets, bolts, etc. Also the ease and simplicity of this method is hampered by the fact that the interior ceiling layer of insulation comprises more than one insulation means; for example the board-like insulation 8 and the insulation means 14.

The object of the present invention is to provide an attractive insulating system which can be easily and rapidly installed either in new construction or in the reinsulation of old construction, that can be used either along or in construction with prior art insulation systems of the type shown in FIG. 1, and that will provide a more efficient insulation system for the types of buildings described above by insulating and isolating all or most of the structural members of the building from the interior of the building, as well as from the exterior covering of this building.

BRIEF SUMMARY OF THE INVENTION

A thermal insulation system for the buildings having parallel, uniformly spaced structural elements, such as purlins, and an exterior covering material, such as steel plates or the like, that is supported by the purlins. The system consists of the combination of: (1) board-like thermal insulation elements each of which spans a space between adjacent purlins at the inner side thereof, the adjacent edge of each two of the board-like elements being supported by support means attached to one of the purlins; (2) second thermal insulation substantially filling the spaces between the purlins; and (3) third thermal insulation positioned between the exterior side of the purlins and the exterior building covering material. The invention also includes particular support means for the board-like, interior insulation elements.

BRIEF DESCRIPTION OF THE DRAWINGS

FIG. 1 is a fragmentary view, partly in perspective and partly in section of a typical prior art insulation system including some of the structural members and the covering materials, and illustrating a known technique for isolating the covering materials from the structural members.

FIG. 2 is a fragmentary view partly in section and partly in perspective of an insulation system according to the present invention.

FIG. 3 is a fragmentary cross-sectional view of a second embodiment of an insulation system according to the present invention.

FIG. 4 is a cross-sectional view of a mounting clip used in the embodiment shown in FIG. 3.

FIG. 5 is a fragmentary view similar to FIG. 2 of a third embodiment of the insulation system according to the present invention.

FIG. 6 is a fragmentary cross-sectional view of a joint in the first insulation means of the present invention.

FIG. 7 is a view similar to FIG. 6 of a different type of joint.

FIG. 8 is a fragmentary view in elevation showing how a joint member shown in FIG. 7 is supported.

FIG. 9 is a view similar to FIGS. 2 and 5 of an alternative embodiment of an insulation system according to the present invention.

FIG. 10 is a fragmentary cross-sectional view showing an alternative technique for isolating the covering material from the structural members.

FIG. 11 is a cross-sectional view of a mounting clip used in the embodiment shown in FIG. 9.

DESCRIPTION OF THE PREFERRED EMBODIMENTS

Commercial and industrial buildings are frequently of the type shown in U.S. Pat. No. 3,121,649 and comprise metal or concrete structures with an outer covering of a material, such as corregated metal, concrete panels, etc., spanning the structure. Both metal and concrete have a relatively high coefficient of thermal conductivity compared to wood and thermal insulating materials and therefore it usually is desirable, and sometimes essential, that these buildings be insulated with a material having a relatively low coefficient of thermal conductivity to reduce the rate of heat flow either into or out of the building. A coefficient of thermal conductivity of about 1.5 BTU/sq.ft./in./° F/hr. or less is a relatively low coefficient of thermal conductivity for purposes of defining the terminology herein. Since the structural members themselves provide paths for substantial heat flow through the walls, insulation systems which do not insulate all or most of the structural members from the interior of the building, and preferably from the covering spanning the structural members of the exterior side of the structural members, permit excessive heat flow through the structural members.

Referring to FIG. 2, one aspect of the present invention insulates and isolates structural members 2, which are illustrated as "S" shaped purlins spanning between conventional supporting columns (not shown). The insulation system of the present invention comprises first board-like insulation means 4 which spans the purlins 2 on the interior of the structure. A covering material such as a corregated metal sheet 6 forms the exterior layer on the structure. The first insulation 4 may be strips of glass fiber blankets or boards, strips of foamed plastic material, or any other material having a relatively low coefficient of thermal conductivity, compared with the thermal conductance of the structural members and the covering material 6 and having sufficient strength and rigidity to resist significant sagging, say not more than about 1 inch bow or sag between adjacent structural members which often are spaced about 5 feet apart. Preferably, no more than ½ inch sag is experienced. A preferable material for the first insulation 4 in the present invention is a board of bonded glass fibers having an apparent density of about 1.75 to 2.5 lbs./cu.ft. or more, most preferably about 3pcf or more.

In the embodiment of FIG. 2, each of the strips constituting the first insulation means 4 overlies and is supported along one of its edge portions 10 by an adjacent first insulation means 4 and spans to and extends beneath an adjacent structural member 2. Each of the first insulation means 4 has a second edge portion 12 in which a depression 14 is formed for accommodating a bottom flange 2a of a purlin 2. The depression 14 is sufficiently deep so that when the bottom surface of the flange 2a is in contact with the bottom of the depression 14 an edge rib 15 of the second edge portion 12 extends above the upper surface of the flange 2a to provide support for the first edge portion 10 of an adjacent first insulation 4. The depression 14 can be cut or pressed into a fiber glass board, either being done in a well known manner.

Preferably, a major surface 18 of the first insulation 4 opposite the surface having the depression 14 is coated or faced with a material that will constitute a vapor barrier, such as a vinyl film. This coating or facing 19 also can provide a pleasing appearance to the interior of the building. The facing or coating 19 should extend around and over an exposed edge 20 of the second edge portion 12 and the rib 16, so as to provide a better vapor seal between the overlapped portions of the adjacent boards of the first insulation 14. To enhance the vapor seal, if preferred, a caulking or sealing material can be applied to the rib 16 prior to installing the adjacent first insulation board 4.

In a preferred embodiment of this aspect of the present invention, the first insulation 4 is a vinyl faced, glass fiber insulation board about 1.125 inches thick and having an insulation value (R-value) as determined by an ASTM C236-66 of about 5.

Any suitable fastening means can be used to hold the first insulation 4 against the flanges 2a. In the embodiment shown in FIG. 2, pop rivets 22 are used with plastic washers 24, e.g., polyethylene or nylon washers can be used.

A second insulation 8 is positioned above the first insulation 4 and between adjacent purlins 2. Any suitable insulating material having a high insulating value is suitable as the second insulation, e.g., blankets or clumps of glass fibers or mineral wool or equivalents. For ease of installation, it is preferred to use batts or continuous strips of bonded glass fibers or mineral wool having an R-value or R-5 or above, preferably R-19 or above, and most preferably an insulating value of about R-30 or higher.

A third insulation A, which is often an embodiment of the prior art insulation of the type shown in FIG. 1, is provided between the top of the purlin 2 and the covering material 6 to isolate purlins 2 from the covering material 6. This third insulation A completes the isolation of the purlins 2 and minimizes heat transfer from those structural members to the covering material 6, thereby also minimizing moisture condensation problems. When the third insulation is in the form of the insulation A shown in FIG. 2, which occurs particularly when an insulation system according to the invention is used to reinsulate a building structure having prior art insulation of the type shown in FIG. 1, the added second insulation 8 can be thinner because the insulation A of the prior art system cooperates therewith. In some instances, such as when the covering material is always on the hot side of the insulation, it is acceptable to have the structural members or purlins 2 in direct contact with the covering material.

FIG. 3 illustrates a modification of the insulation system shown in FIG. 2. In this modification, the second edge portion 12 of the first insulation 4 is fastened to the flange 2a in the depression 14 using an elongated clip 26 that extends along the edge of the first insulation means 4. A bottom portion 28 of the clip 26 supports the bottom face of the second edge portion 12 and extends away from the edge portion 12 past a vertical web 30 of the purlin 2 preferably about an inch or more. An upper portion 32 of the clip 26 supports the first edge portion 10 of the adjacent first insulation means 4.

The longer leg 28 of the clip 26 is designed to support the ends of transversely extending "H" or "T" bars, or the like, between longitudinally adjacent edges of the first insulation means 4 as more fully described below with reference to FIGS. 6–8, inclusive.

As shown in FIG. 4, the clip 26 comprises the longer leg 28, the upper leg 32 which has an edge 34 offset by a web 36 toward the leg 28, the legs 28 and 32 being connected by a web 38 which is wider than the web 36. As best can be seen in FIG. 3, the clip 26 is opened from its normal configuration and slipped over the rib 16 to embrace the flange 2a and the edge portion 12 of a first insulation board 4 to retain the board 4 firmly in place. The clip 26 can be made of any material having sufficient resilience so that its legs 28 and 32 can be separated to allow for its installation and still try to return to its original configuration with sufficient force to hold the first insulation 4 in its proper position. A preferred material is rigid polyvinyl cloride, preferably having the same or similar color as the facing 19.

One significant advantage of the modification shown in FIG. 3 over the embodiment shown in FIG. 2 is that the insulation system of FIG. 3 can be more easily installed from the exterior sides of the structural members 2, i.e. on top of the roof, than can the embodiment of FIG. 2. This is often important, particularly when reinsulating an existing structure where equipment and other objects permanently in the building would hamper the erection of scaffolds for working below the rafters 2, or in high roofed buildings where it is easier to work from the roof than to erect tall scaffolds that have to be moved frequently during construction. The clip 26 as used in the modification shown in FIG. 3 also provides a continuous support for the first insulation 4 as opposed to the periodic support provided by the fastening means 22 and 24 used in the embodiment shown in FIG. 2.

FIG. 5 illustrates another embodiment of the present invention. This embodiment differs from the embodiment shown in FIG. 3 in that the first insulation 4 does not have a depression. This modification requires that a web 38a of a clip 26 be wider than the web 38 of the clip 26 used in the embodiment shown in FIG. 3. Also, the first insulation 4 lies at a slightly greater angle with respect to the flange 2a of the purlin 2 in this embodiment than in the embodiment shown in FIG. 3. The two important advantages of the embodiment shown in FIG. 5 over the embodiment shown in FIG. 3 are that (1) the purlin 2 is better isolated thermally from the interior of the building due to the fact that the insulation boards 4 do not need a depression like the depression 14 shown in FIG. 3, and (2) the added expense of forming the depression 14 is avoided. An open region 40 resulting from the wider web 38a in this embodiment if desired can be filled with a strip of any suitable insulating material to even further insulate the purlin 2 from the interior of the building. A foaming type insulation also could be injected into the open region 40 after installation.

In the embodiment shown in FIG. 5, the clip 26 is so designed that when in the installed position, the leg 28 fits against the faced surface 18 of the first insulation 4 and the second shorter leg 34 fits against the upper surface of the flange 2a of the purlin 2. In this position, the upper leg 32 of the clip 26 will support the first edge portion 10 of an adjacent first insulation board 4.

Frequently, the structural members 2 are longer than the first insulation boards 4. When this occurs, it is necessary to use more than one panel or board or strip of the first insulation means 4 resulting in a joint between two longitudinally adjacent panels.

FIGS. 6-8 show several suitable methods of providing a vapor barrier seal and support at these joints. In FIG. 6, with either of the embodiments shown in FIGS. 2, 3 or 5, an H-shaped member 42 can be used to provide a vapor barrier at the joint between two adjacent panels 4. The H-shaped member 42 is preferably made of a metal or a plastic material such as a rigid polyvinyl chloride, and at least that portion exposed to the interior of the building is preferably of the same color as the facing 19. A good seal is insured if the combination of the thickness of the insulation board 4 and the facing 19 is slightly thicker than the spaces between the parallel arms of the H-shaped member 42 so that the first insulation boards 4 must be slightly compressed in order to insert them therebetween. When used in the embodiment shown in FIG. 5, the length of the H-shaped member 42 should be the same as the width of the first insulation board 4. In the embodiment shown in FIG. 3 the member 42 will rest on that portion of the leg 28 of the clip 26 extending beyond the web 30 of the purlin 2.

FIG. 7 is a cross-section taken from the same position as FIG. 6 and illustrates the use of a T-shaped member 44 filling the joint between two longitudinally adjacent pieces of the first insulation 4. It can be noted that one end of the T-shaped member 44 rests on an upper surface of the long leg 28 of the clip 26. When used with the embodiment shown in FIG. 5, one end of the T-shaped member 44 can extend completely under the flange 2a of the purlin 2, as shown in FIG. 8.

Preferably, cross bars 46 of the T-shaped members 44 that would rest on the legs 28 and 32 of the clips 26 are removed, as shown in the righthand portion of FIG. 8, to provide a better vapor seal between the first insulation boards 4 and the legs 28 and 32. Removing those portions of the cross bars 46 aligns the top surface 48 of the bottom member 46 with the upper surfaces of the legs 28, 32, thus eliminating the small gaps 50 shown in FIG. 7.

FIG. 9 illustrates another preferred embodiment of the present invention in which the first insulation means 4 are supported so as to provide a flat ceiling. This modification provides a clip 52 that extends along the edge of the first insulation means 4 similar to clip 26.

As shown in FIG. 11, the clip 52 comprises a long bottom leg 54, an upper leg 56, which has an edge offset by a web 60 toward the leg 54, the legs 54 and 56 being connected by a web 62. The bottom leg 54 has an integral portion 64 extending past the juncture of the leg 54 and the web 62.

Like the clip 26, each clip 52 is fabricated from resilient material so that its legs 54 and 56 together with edge 58 can be moved away from each other and the clip can be slid into embracing relationship to an edge portion 10 of a first insulation means 4 and a flange 2a of a purlin 2 and the edge 12 of the adjacent insulation means 4 is supported by the extending portion 64 as shown in FIG. 9.

In all of the embodiments shown, it is preferred that the second insulation 8 be of sufficient thickness that it must be compressed somewhat when the first insulation 4 is put into the positions shown in the drawings. When compressed, the second insulation 8 applies a small downward force against the first insulation improving the vapor barrier seal between the facings 19 of the first insulation means 4 and the various supports. Better vapor barriers are desirable, of course, because the structural members may be either significantly cooler or warmer than the interior of the building. If warm air from the interior of the building is permitted to flow up around the structural members, the cooler structural members will cool this warmer air leaving water condensation on the structural members. Such a result is undesirable and can damage both the structural members and the insulation system. Adhesives, sealing compounds, or pressure sensitive tapes can be used in the vapor sealing areas previously described, but this is usually not necessary in the system of the present invention and therefore would, in most cases, needlessly add to the cost of the installation.

When the insulation system of the present invention is used along with a prior art insulation system, such as that shown in FIG. 1, the structural members 2 are isolated by the prior art insulation system from the covering material 6. When the third insulation A has a vapor barrier layer B on its lower or interior face, the barrier layer can be punctured periodically to prevent trapping moisture between the second insulation 8 and the barrier layer facing on layer A.

As shown in FIG. 10, the third insulation means for isolating the covering material 6 from the structural members 2 may be a strip of material 66, having a relatively low coefficient of thermal conductivity as compared with the covering material 6 and the purlins 2. For examples, the insulation material 52 can be strips of glass fiber blanket or board, strips of foamed plastic material, strips of wood, or any other material having a relatively low coefficient of thermal conductivity.

What is claimed is:

1. An insulation system for building structures having a plurality of parallel structural members and a covering material spanning the structural members on the exterior side, both the structural members and the covering material having a relatively high coefficient of thermal conductivity, comprising:
   (a) first insulation board-like means for isolating the structural members from the interior of the building, said first insulation means being supported along a first edge portion adjacent to a lower portion of a first structural member, said first insulation means spanning to and having a second edge portion extending beneath an adjacent second structural member,
   (b) a second insulation means located adjacent to and above a major surface of said first insulation means and between adjacent structural members, said second insulation means having a lower density and a higher thermal insulation value than said first insulation means,
   (c) fastening means for urging the second edge portion of said first insulation means into contact with the lower portion of said second structural member,
   (d) said fastening means comprising clip means for holding the second edge portion of said first insulation means onto said structural member such that a portion of said clip means provides support for a first edge portion of an adjacent first insulation means, said clip means extending from a major surface on said first insulation means opposite said structural member, around a minor surface of said second edge portion, and onto an upper surface of the lower portion of said structural member.

2. An insulation system for building structures having a plurality of parallel structural members and a covering material spanning the structural members on the exterior side, both the structural members and the covering material having a relatively high coefficient of thermal conductivity, comprising:
   (a) first insulation board-like means for isolating the structural members from the interior of the building, said first insulation means being supported along a first edge portion above and adjacent to a lower portion of a first structural member by an upper surface of the second edge portion of an adjacent first insulation means, said first insulation means spanning to and having a second edge portion extending beneath an adjacent second structural member, the upper surface of said second edge portion of said first insulation means containing a depression means for accommodating a bottom portion of the structural member such that when said depression is in contact with the lower portion of the structural member, a non-depressed edge portion of the second edge portion extends above an upper surface of the lower portion of the structural member to provide the support for the first edge portion of an adjacent first insulation means,
   (b) a second insulation means located adjacent to and above a major surface of said first insulation means and between adjacent structural members, said second insulation means having a lower density and a higher thermal insulation value than said first insulation means, and
   (c) fastening means for urging the second edge portion of said first insulation means into contact with the lower portion of said second structural member.

3. An insulation system as defined in claim 2 including a third thermal insulation positioned between said structural members and said covering material.

4. An insulation system as defined in claim 1 wherein said second edge portion of said first insulation means contains a depression means for accommodating the lower portion of said structural member and wherein said clip means holds said second edge portion of said first insulation means such that the lower portion of said structural member resides in said depression means.

5. An insulation system as defined in claim 1, wherein said clip means comprises a long leg and a short leg and an upper support portion connected to the short leg by a first web and connected to the long leg by a second web, said second web being longer than said first web, said short leg forming an angle with said long leg when said clip is in a relaxed condition.

6. An insulation system for building structures having structural members and a covering material spanning the structural members on the exterior side, both the structural members and the covering material having a relatively high coefficient of thermal conductivity, comprising:
   (a) a first insulation board-like means supported along a first edge portion above a second edge portion of an adjacent first insulation means and a portion of a first structural member, and spanning to and having a second edge portion extending beneath an adjacent second structural member, said second edge portion having a depression means therein in a major surface for accommodating a bottom portion of a structural member.
   (b) clip means for holding the second edge portion of said first insulation means onto said structural member such that a portion of said structural member occupies said depression means, said clip means extending from a major surface on said first insulation means opposite said depression means, around a minor surface of said second edge portion, and onto an upper surface of the lower portion of said structural member, said clip being so shaped that a portion of the exterior of said clip means provides support for the first edge portion of an adjacent first insulation means, and (c) a second insulation means located adjacent to and above a major surface of said first insulation means and between adjacent structural members, the thermal insulating value of said second insulation means being greater than the thermal insulating value of said first insulation means.

7. An insulation system for building structures having structural members and a covering material spanning the structural members on the exterior side, both the structural members and the covering material having a relatively high coefficient of thermal conductivity, comprising:

(a) a first insulation board-like means supported along a first edge portion adjacent a second edge portion of an adjacent first insulation means and a lower portion of a first structural member, and spanning to and having a second edge portion extending beneath an adjacent second structural member.

(b) clip means for holding the second edge portion of said first insulation means onto a lower portion of said second structural member, said clip means extending from a major surface on said first insulation means opposite a major surface adjacent said second structural member, around a minor surface of said second edge portion, and onto an upper surface of the lower portion of said second structural member, said clip means so shaped that a portion of the exterior of said clip means provides support for a first edge portion of an adjacent first insulation means, and (c) a second insulation means located adjacent to and above a major surface of said first insulation means and between adjacent structural members, said second insulation means having a lower density and a higher thermal insulation value than said first insulation means.

8. An insulation system as defined in claim 7 including a third thermal insulation positioned between said structural members and said covering material.

9. An insulation system as defined in claim 7 wherein said clip comprises an upper leg and a lower leg and an upper support portion connected to said upper leg by a first web and connected to said lower leg by a second web, said second web being longer than said first web, said upper leg forming an angle with said lower leg when said clip is in a relaxed condition.

10. A thermal insulation system for buildings having a plurality of longitudinally extending structural members spanning between supports, said members being uniformly spaced and parallel, said building also having a covering material for the exterior thereof, said system consisting of the combination of:

(a) first board-like thermal insulation consisting of a plurality of longitudinally extending elements, each being at least wide enough to span the space between said structural members and located at the interior side thereof, (b) second thermal insulation substantially filling the spaces between said structural members and between said covering material and said first thermal insulation, said second insulation having a lower density and a higher thermal insulation value than said first insulation, and (c) support means associated with each of said structural members and adapted to support the adjacent edges of two of said first thermal insulation elements, in generally the same plane, (d) said support means comprising a clip for urging edge portions of each of said first insulation elements into contact with said structural members and for supporting other edge portions of adjacent first insulation elements, said clip extending from an upper surface of the lower portions of said structural members, around the edges thereof, between minor surfaces of adjacent first insulation elements, and extending beneath a portion of the lower major surfaces of said adjacent first insulation elements.

11. An insulation system as defined in claim 10 wherein the clip comprises a long bottom leg and a shorter opposed bottom leg which are substantially in the same plane, and a top leg extending over and spaced from said long bottom leg, said top leg being connected by a web to the line of intersection of said long and shorter bottom legs, said top leg forming an acute angle with said long leg when said hanger is in a relaxed condition.

* * * * *